(12) United States Patent
Shi

(10) Patent No.: US 10,778,714 B2
(45) Date of Patent: Sep. 15, 2020

(54) METHOD AND APPARATUS FOR GENERATING CYBER SECURITY THREAT INDEX

(71) Applicant: BARRACUDA NETWORKS, INC., Campbell, CA (US)

(72) Inventor: Fleming Shi, Scotts Valley, CA (US)

(73) Assignee: Barracuda Networks, Inc., Campbell, CA (US)

( * ) Notice: Subject to any disclaimer, the term of this patent is extended or adjusted under 35 U.S.C. 154(b) by 184 days.

(21) Appl. No.: 15/920,855

(22) Filed: Mar. 14, 2018

(65) Prior Publication Data

US 2019/0036958 A1 Jan. 31, 2019

Related U.S. Application Data

(60) Provisional application No. 62/537,382, filed on Jul. 26, 2017.

(51) Int. Cl.
| | |
|---|---|
| *H04L 29/06* | (2006.01) |
| *G06N 5/02* | (2006.01) |
| *G06F 16/33* | (2019.01) |
| *G06F 21/57* | (2013.01) |
| *G06F 16/34* | (2019.01) |
| *G06F 16/2458* | (2019.01) |

(52) U.S. Cl.
CPC ...... *H04L 63/1433* (2013.01); *G06F 16/2465* (2019.01); *G06F 16/334* (2019.01); *G06F 16/345* (2019.01); *G06F 21/577* (2013.01); *G06N 5/02* (2013.01); *H04L 63/0428* (2013.01); *H04L 63/1425* (2013.01); *H04L 63/1466* (2013.01)

(58) Field of Classification Search
CPC ............ H04L 63/1433; H04L 63/0428; H04L 63/1466; H04L 63/1425; G06F 16/2465; G06F 16/345; G06F 21/577; G06F 16/334; G06N 5/02
See application file for complete search history.

(56) References Cited

U.S. PATENT DOCUMENTS

| | | | | |
|---|---|---|---|---|
| 7,904,913 | B2 * | 3/2011 | Sim-Tang | G06F 11/1448 719/318 |
| 8,544,023 | B2 * | 9/2013 | Sim-Tang | G06F 11/1448 719/311 |
| 10,581,874 | B1 * | 3/2020 | Khalid | H04L 67/06 |

(Continued)

*Primary Examiner* — J. Brant Murphy

(57) ABSTRACT

A new approach is proposed to support generating and presenting a single composite Cyber Security Threat Index (CSTI) to a user, wherein the CSTI provides the user with an indication of risk of cyber attacks globally and/or in the context of his/her current networking environment. First, various pools of operational data are collected over networks, systems, and/or products, wherein such data includes files being weaponized in the cyber attacks against computer systems and networks, the surfaces and contexts on which the cyber attacks are launched, and influential factors on these data. The data collected from various pools is then synchronized, correlated, and filtered/cleansed so that it can be used to assess risk of the cyber attacks. The CSTI is calculated based on the correlated data on the cyber attacks and interactively presented to the user, who then takes corresponding remediation actions to prevent a cyber attack from happening or spreading.

37 Claims, 5 Drawing Sheets

(56) References Cited

U.S. PATENT DOCUMENTS

| | | | |
|---|---|---|---|
| 2006/0101384 A1* | 5/2006 | Sim-Tang | G06F 11/1448 |
| | | | 717/104 |
| 2006/0253709 A1* | 11/2006 | Cheng | G06F 21/577 |
| | | | 713/182 |
| 2011/0252432 A1* | 10/2011 | Sim-Tang | G06F 11/1448 |
| | | | 719/318 |
| 2013/0031625 A1* | 1/2013 | Lim | G06F 21/552 |
| | | | 726/22 |
| 2014/0380488 A1* | 12/2014 | Datta Ray | H04L 63/1433 |
| | | | 726/25 |
| 2015/0381649 A1* | 12/2015 | Schultz | H04L 63/1433 |
| | | | 726/25 |
| 2016/0028758 A1* | 1/2016 | Ellis | G06F 21/52 |
| | | | 726/25 |
| 2017/0013011 A1* | 1/2017 | Renouil | G06Q 20/085 |
| 2017/0187745 A1* | 6/2017 | Ng | H04L 63/20 |
| 2017/0346846 A1* | 11/2017 | Findlay | H04L 63/1433 |
| 2017/0366572 A1* | 12/2017 | King-Wilson | G06Q 40/08 |
| 2018/0191765 A1* | 7/2018 | Cho | H04L 63/1425 |
| 2019/0327259 A1* | 10/2019 | DeFelice | H04L 63/1433 |

\* cited by examiner

200

Collect timely and continuously data on risks of current and/or potential cyber attacks from a plurality of data pools over networks, systems, and/or products for real time cyber attack risk analysis, wherein data being collected from at least one of the data pools is actual data to be processed for cyber attack risk analysis and data being collected from at least one of the data pools is influential data on the actual data being collected
202

Synchronize and correlate the data collected from the data pools once the data is readily available to ensure that there is fidelity among the data from the various data pools
204

Calculate a single composite cyber security threat index (CSTI) based on the correlated and cleansed actual data on cyber attack risks and its corresponding influential data, wherein the CSTI not only provides a user with an indication of the current risk of a cyber attack but also predicts an elevated level of risk of a future cyber attack
206

Present the CSTI to the user along with one or more suggested applications by the user in response to the CSTI to block the current cyber attack and/or to prevent the future cyber attack
208

FIG. 2

Scan Description

The file was scanned by the Barracuda Advanced Threat Detection (ATD) service. ATD scans for malware, zero-day exploits, and targeted attacks not detected by other virus scanning features of the intrusion prevention system. ATD analyzes files in a secure cloud environment and makes an overall determination once scanning is complete.

Overall Determination

| | |
|---|---|
| Verdict | MALICIOUS |

File Metadata

| | |
|---|---|
| Extension | rtf |
| Mime Type | application/rtf |
| Size | 6735 bytes |
| SHA-256 | fe2e5d054fb4cc878f6ec40bec216c78a6a3547c86408d54e7ed97d85da377cecc00b |
| SHA-1 | 1b1ce1ce56ce97c8b914f0bc30e5233f806239a84 |
| MD5 | 419fcc6ed10b36cca86e0761334018c1 |

Threat Analysis

Behavioral Heuristics

| | |
|---|---|
| Determination | MALICIOUS |
| Details | EXP/CVE-2017-0199.gen ; exploit ; Contains detection pattern of the exploit EXP/CVE-2017-0199.gen |

METHOD AND APPARATUS FOR GENERATING CYBER SECURITY THREAT INDEX

CROSS-REFERENCE TO RELATED APPLICATIONS

This application claims the benefit of U.S. Provisional Patent Application No. 62/537,382, filed Jul. 26, 2017, and entitled "METHOD AND APPARATUS FOR CYBER SECURITY THREAT INDEX," which is incorporated herein in its entirety by reference.

BACKGROUND

The formation of Internet led to massive amount of adoption in how people/users interact with computer systems in the 1990's and early 2000's. Moreover, the user interfaces people lived by helped them to utilize computer systems and networks as new tools to enhance their capabilities in solving issues for the real world. However, the user interfaces were limited at the time, which led to development of more ways to interact with the computer systems and the networks. In many forms of consumption, information is delivered to, consumed/digested by the users who eventually get the systems to perform many tasks such as online shopping and banking, etc. As people continue to build connections among the computer systems, they also start to share digital content which include but is not limited to documents, voices, images, videos, phrases, gestures and many other forms of communications among the systems. The rapid increases in sharing of such digital content has led to the explosion of social media where people have developed another dimension of themselves and their relationships with others. Before social media, people connected with each other via face-to-face meetings, phone calls, newspapers and radio/television broadcasts. But now one can interact with others almost instantaneously via digital content/electronic messages in the forms that include but are not limited to emails, instant messages, short messages, text messages, social media posts, and even video phone calls. When the exposure is so large in the digital world with so many forms of media, people are naturally and inevitably introducing more security risks in the cyber world/cloud/Internet into the computer systems and networks they use and interact with than they had before. Unlike their physical biological forms in which people may sense danger, triage and remediate, people lack sensors, urgency and risk assessment capabilities in the digital world, which leads to computer systems ill-prepared for the risks of cyber attacks. It is thus desirable to create an index that indicates the threats/risks of cyber attacks a person or organization/company may face to help them stay alert, triage and remediate such threats.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2 depicts a flowchart of an example of a process to support generating a single composite CSTI in accordance with some embodiments.

FIG. 3B depicts an example of a screenshot of cyber attack risk analysis report for the attached RTF file type of NotPetya; FIG. 3C depicts an example of a screenshot of an analysis of what the RTF file type tries to do when an attachment to the NotPetya-type ransomware was downloaded in accordance with some embodiments.

DETAILED DESCRIPTION OF EMBODIMENTS

Figure 1:
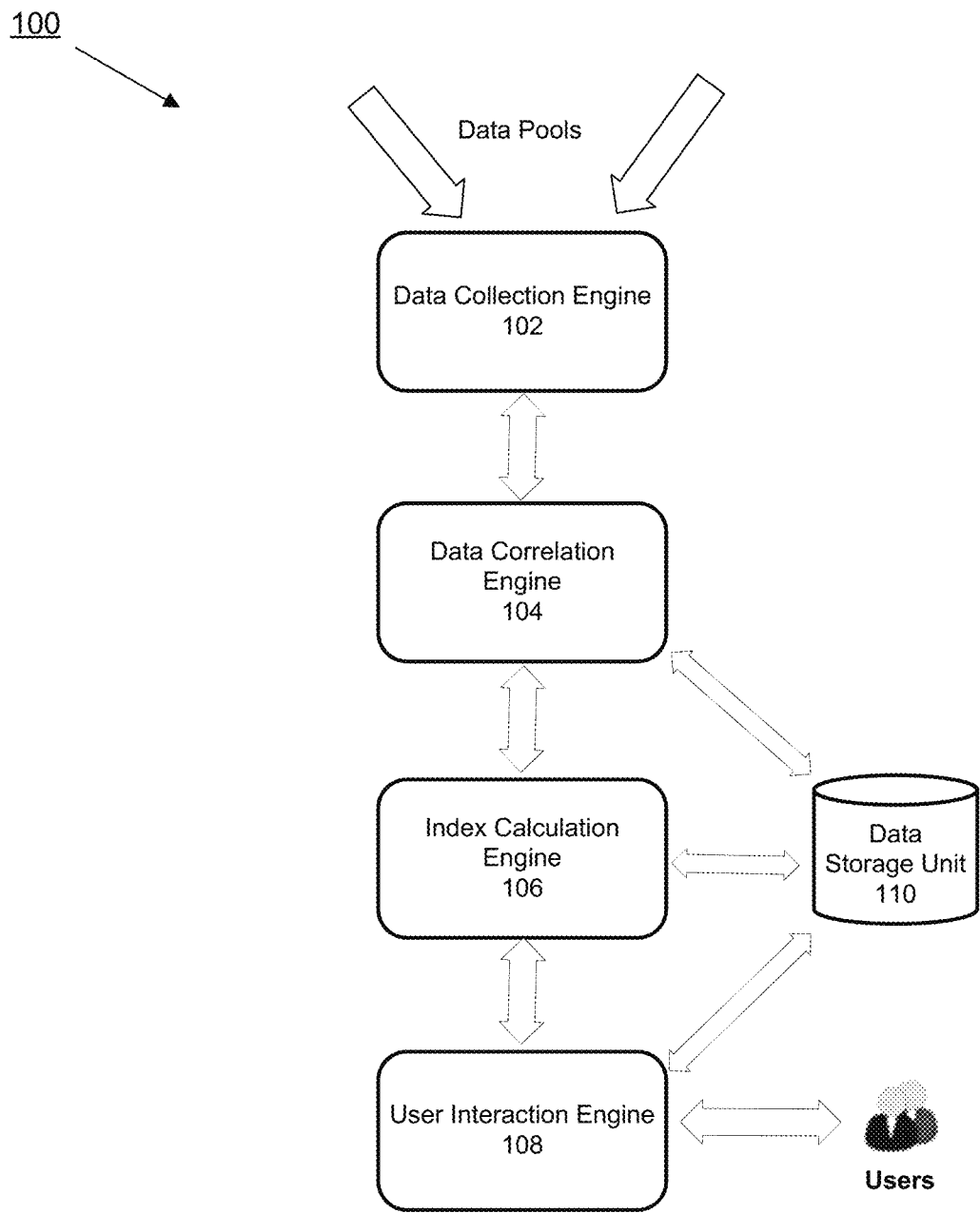
FIG. 1 depicts an example of a system diagram to support generating a single composite Cyber Security Threat Index (CSTI) in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support generating and presenting a single composite Cyber Security Threat Index (CSTI) to a user, wherein the CSTI provides the user with an indication of the risk of cyber attacks globally and/or in the context of his/her current networking environment. First, various sources/pools of data are collected from operational networks, systems, and/or products for index calculation, wherein such operational data includes but is not limited to files that are being weaponized in the cyber attacks against computer systems and networks, the surfaces and contexts on which the cyber attacks are launched, and influential factors on these data. The data collected from various pools is then synchronized, correlated, and filtered/cleansed so that it can be used to assess the risk of the cyber attacks. The CSTI is then calculated based on the correlated data on cyber attacks and interactively presented to the user, who may then take corresponding remediation actions to prevent a cyber attack from happening or spreading.

Under the proposed approach, the CSTI not only provides the user with an indication of the current risk of a cyber attack, it may also predict or forecast an elevated level of threat of a cyber attack that may happen in the future, and thus enabling the user to take cautionary measures accordingly before the cyber attack actually happens. Additionally, the CSTI is not limited to a global form that reflects the global risk of cyber attacks, it can also be in a customized/personalized form in the context of the current computing and network environment of the user to reflect the risk of cyber attacks that may specifically target the user.

As used hereinafter, the term "user" (or "users") refers not only to a person or human being, but also to an organization, a group of organizations, a country, and even a continent that may be subject to a cyber attack.

FIG. 1 depicts an example of a system diagram 100 to support generating a single composite Cyber Security Threat Index (CSTI). Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least a data collection engine 102, a data correlation engine 104, an index calculation engine 106, a user interaction engine 108, and a data storage unit 110. These engines and units runs on one or more computing units/appliances/hosts (not shown) each with software instructions stored in a storage unit such as a non-volatile memory (also referred to as secondary memory) of the computing unit for practicing one or more processes. When the software instructions are executed, at least a subset of the software instructions is loaded into memory (also referred to as primary memory) by one of the computing units of the host, which becomes a special purposed one for practicing the processes. The processes may also be at least partially embodied in the host into which computer program code is loaded and/or executed, such that, the host becomes a special purpose computing unit for practicing the processes. When implemented on a general-purpose computing unit, the computer program code segments configure the computing unit to create specific logic circuits.

In the example of FIG. 1, each host can be a computing device, a communication device, a storage device, or any computing device capable of running a software component. For non-limiting examples, a computing device can be but is not limited to a server machine, a laptop PC, a desktop PC, a tablet, a Google's Android device, an iPhone, an iPad, and a voice-controlled speaker or controller. Each host has a communication interface (not shown), which enables the engines and the units to communicate with each other, the user, and other devices over one or more communication networks following certain communication protocols, such as TCP/IP, http, https, ftp, and sftp protocols. Here, the communication networks can be but are not limited to, internet, intranet, wide area network (WAN), local area network (LAN), wireless network, Bluetooth, WiFi, and mobile communication network. The physical connections of the network and the communication protocols are well known to those of skill in the art.

In the example of FIG. 1, the data collection engine 102 is configured to timely and continuously collect data on current and/or potential cyber attacks from multiple data sources or pools over operational networks, systems, and/or products for just-in-time or real time data correlation and CSTI calculation. Here, the data collection engine 102 is configured to collect the data from the data pools by one or more of streaming, pushing or pulling raw data in its original format, data normalized with respect to other data sources, and/or full-text-searchable indexes of data. In some embodiments, the data collection engine 102 is configured to collect such data in the current networking environment (e.g., networks, systems, and/or products) of a user. In some embodiments, the data collection engine 102 is configured to optimize the collected data into consume-ready form in order to reduce processing time for data correlation.

In some embodiments, at least one pool of data being collected by the data collection engine 102 is actual data to be processed for cyber attack risk analysis, wherein such pool of actual data is tangible and operationally available and can be collected through, e.g., network traffic logs and operational telemetry. In some embodiments, the pool of actual data can be aggregated and consolidated by the data collection engine 102 so that the data can be viewed from different perspectives. In some embodiments, the pool of actual data may include one or more threats by file types weaponized for cyber attacks, wherein the files can be the types of, for non-limiting examples, PDFs, Java scripts, Office docs, program executables, etc., and one or more threats by attack surfaces where the cyber attacks are launched, which, for non-limiting examples, can be inbound and outbound emails, inbound and outbound Web traffic, Web-based applications, internal and/or external or physical and/or wireless networks, endpoint devices such as removable storage devices, etc. In some embodiments, the pool of actual data being collected by the data collection engine 102 may further include one or more cost of analytics and detection of the threats of cyber attacks in dollar amount, cost of analytics and detection of the threats of cyber attacks in terms of compute resources required, and the number of cyber attack incidents that have been analyzed and/or detected.

In some embodiments, at least one pool of data being collected by the data collection engine 102 is influential data, which influences the weights (or multiplication factors) on various kinds the actual data being collected for cyber attack risk analysis. For non-limiting examples, such pool of influential data includes one or more of geographical locations of the actual data being collected, the context (political or environmental) of the actual data being collected, and the current trend of the actual data being collected. In some embodiments, the pool of influential data may further include the context of the user for whom the cyber attack risk analysis is being performed, wherein such context includes but is not limited to the computer system and/or network configurations (e.g., IP addresses, internal and/or external or physical and/or wireless networks, endpoint devices, etc.) and/or other demographic information of the user. In some embodiments, the data collection engine 102 is configured to derive such pool of influential data from one or more of social media, news media and geopolitical-related events associated with the user. In some embodiments, the data collection engine 102 is configured to automatically or manually intervene to adjust or overwrite the influential data.

In the example of FIG. 1, the data correlation engine 104 is configured to synchronize and correlate the data collected from different data pools once such data is readily available to ensure that there is fidelity among the data from the various data pools. In some embodiments, the data correlation engine 104 is configured to realign the actual data point in one data pool with the corresponding influential data point in another data pool so that the actual data point can be weighed appropriately during cyber attack risk analysis. In some embodiments, once the data from different data pools has been correlated, the data correlation engine 104 is further configured to cleanse the collected data of information (e.g., metadata) that is unrelated to cyber attack risk analysis and prepare the data to be used for CSTI calculation. In some embodiments, the data correlation engine 104 is configured to store and maintain the correlated data in data storage unit 110, wherein the correlated data stored in the data storage unit 110 can be retrieved by the index calculation engine 106 and/or the user via the user interaction engine 108 upon requests.

In the example of FIG. 1, the index calculation engine 106 is configured to calculate/derive a single composite cyber security threat index (CSTI) based on the correlated and cleansed actual data on cyber attack risks and its corresponding influence factors. As discussed above, the CSTI not only provides the user with an indication of the current risk of a cyber attack, it may also predict or forecast an elevated level of threat of a cyber attack that may happen in the near future. In some embodiments, the index calculation engine 106 is configured to calculate the CSTI by utilizing a mathematical or statistical predicative model on a uniform scale, wherein the predicative model can be defined, customized and/or implemented specific to the context of computer systems and networks of each user and/or its use case. In some embodiments, the predicative model may have multiple dimensions, which, for non-limiting examples, include geographic locations of the data, application or file types of the cyber attack, surfaces of the cyber attack, and/or demographics of the user. In a variety of use cases, the index calculation engine 106 is configured to customize implementation of the predicative model for a specific user application, which utilizes the CSTI for automated responses to a current or future cyber attack that maps to a granularity of the scale of such attack.

In some embodiments, the index calculation engine 106 is configured to calculate the CSTI as a product of a maximum value of a scale and a sum of all scores based on the actual data (e.g., various file types and attack surfaces) with coefficient of influenced weights (e.g. x, y, factions of 100%), divided by total artifacts (file types, numbers, and/or surfaces) observed and examined within a time window as shown by an example of a formula of the predicative model below:

$$\frac{\sum (\text{Weight}(X) \times \text{EmailInboundMaliciousPDFs} + \text{Weight}(Y) \times \text{WebInboundMaliciousMSDocs} \ldots)}{\text{TotalNumberOfArtifacts}} \times \text{MaxValueOfScale}$$

In the example above, X and Y are the statistical-based historical/actual data (e.g., PDF file types and MS Word docs launched from inbound emails and inbound Web traffic, respectively) of cyber attacks and Weight(X) and Weight(Y) are the corresponding influential coefficient based on their influential data. The total number of artifacts is a count of all the files launched from all attack surfaces/vectors. The scale of the SCTI can be, for non-limiting examples, a binary scale (0=good, 1=bad) or a 1-9 scale (1-3=good, 4-6=warning, 7-9=bad).

Once the CSTI is calculated, it can be utilized to classify a current of future threat and to automatically launch a specific application by the user as a response to the current of future threat, wherein the classification and response correspond to the CSTI on the scale, e.g., per increments of 1. Here, some applications based on the CSTI are actions and remediation steps, which would help to stop a current attack or warn on potential attacks. For a non-limiting example, in the example of the 1-9 scale discussed above, when the CSTI hits the "bad" range, an integrated firewall or control plane for security products can instrument much stronger security policies in various data-path contact points or configuration settings in the user's current environment to block/counter a current attack or to prevent a future attack.

In the example of FIG. 1, the user interaction engine 108 is configured to present the CSTI to the user along with one or more suggested applications by the user in response to the CSTI automatically (e.g., when the CSTI is in the bad range) or upon receiving a request/instruction from the user. In some embodiments, the user interaction engine 108 is configured to accept an inquiry from the user for additional information or details on the risk of current or future cyber attacks around the globe or specific to the user and interactively present such information to the user accordingly via interacting with other components of the system 100. In some embodiment, the user interaction engine 108 runs on a voice-activated device (e.g., Amazon's Echo devices or Google's Home), wherein the user interaction engine 108 is configured to recognize, accept, and execute a verbal instruction from the user and perform operations corresponding to the verbal instruction accordingly.

FIG. 2 depicts a flowchart 200 of an example of a process to support generating a single composite Cyber Security Threat Index (CSTI). Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where data on risks of current and/or potential cyber attacks are timely and continuously collected from a plurality of data pools over networks, systems, and/or products for real time cyber attack risk analysis, wherein data being collected from at least one of the data pools is actual data to be processed for cyber attack risk analysis and data being collected from at least one of the data pools is influential data on the actual data being collected. The flowchart 200 continues to block 204, where the data collected from the data pools are synchronized and correlated once the data is readily available to ensure that there is fidelity among the data from the various data pools. The flowchart 200 continues to block 206, where a single composite cyber security threat index (CSTI) is calculated based on the correlated and cleansed actual data on cyber attack risks and its corresponding influential data, wherein the CSTI not only provides a user with an indication of the current risk of a cyber attack, but also predicts an elevated level of risk of a future cyber attack. The flowchart 200 ends at block 208, where the CSTI is presented to the user along with one or more suggested applications by the user in response to the CSTI to block the current cyber attack and/or to prevent the future cyber attack.

Figure 3A:
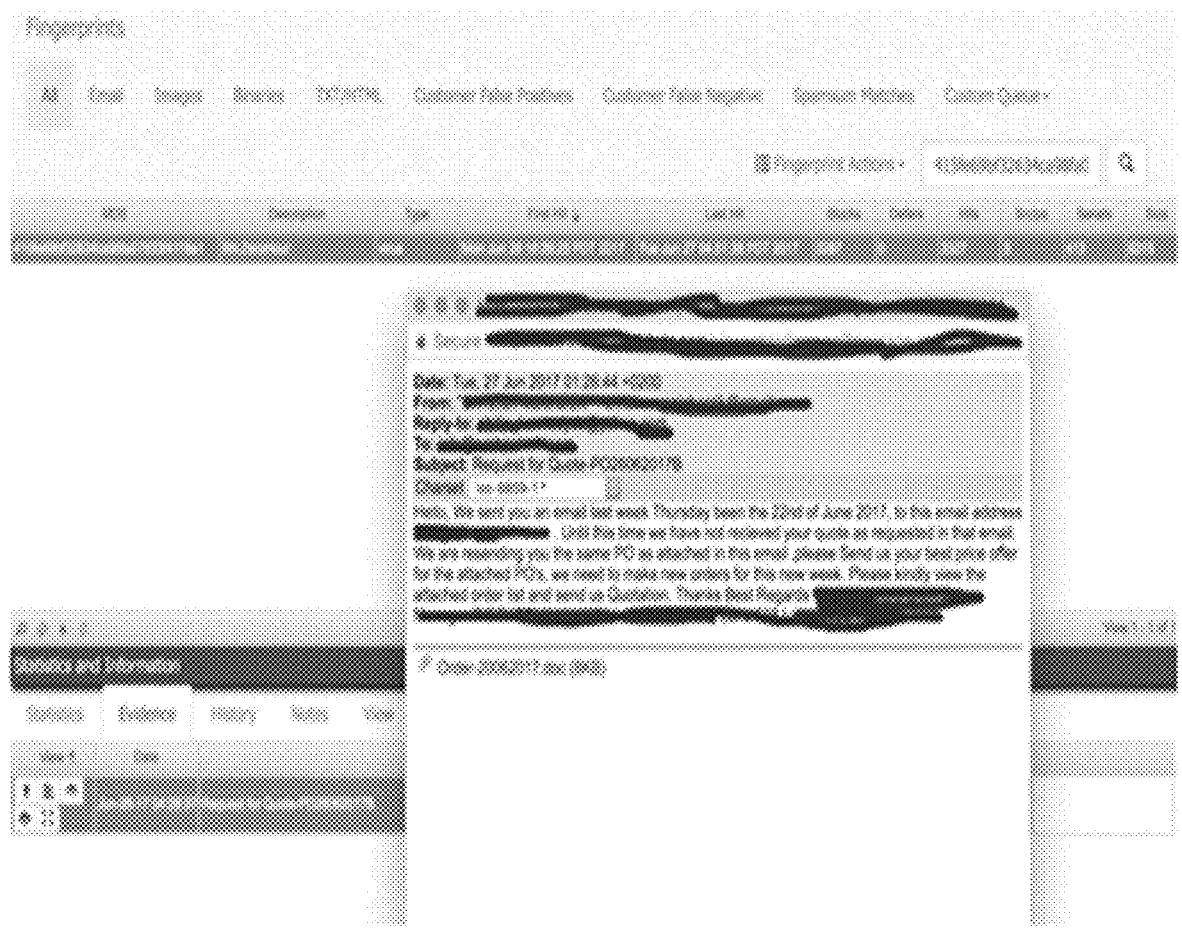
FIG. 3A depicts an example of a NotPetya-type ransomware.

The following is a non-limiting example of a use case on how the CSTI calculated based on collected data on risks of a potential cyber attack can be predictive and be used to get ahead of the actual attack before it happens. NotPetya, or Netya, was a malware spread through malicious email attachments in RTF format and compromised MEDocs software as shown by the example in FIG. 3A. It appeared to be a Petya-type ransomware when the first attack was reported on Jun. 27, 2017. Throughout the next few hours, however, it became clear to the security industry that the attack was a new one that had never been seen before, unlike the version of Petya that had been observed in 2016.

A cyber security system called Barracuda Real Time System (BRTS) like the system 100 described above is constantly engaged with tens of thousands of customer environments and it is able to respond to malicious email attacks in seconds. BRTS identified the first sample of NotPetya ransomware on Jun. 26, 2017, at 4:30 pm PST. BRTS then detected and blocked over 3000 copies of this malicious email from multiple source IP addresses, and the impact was seen in over 400 customers of Barrcuda's Email Security Gateway product.

Figure 3C:
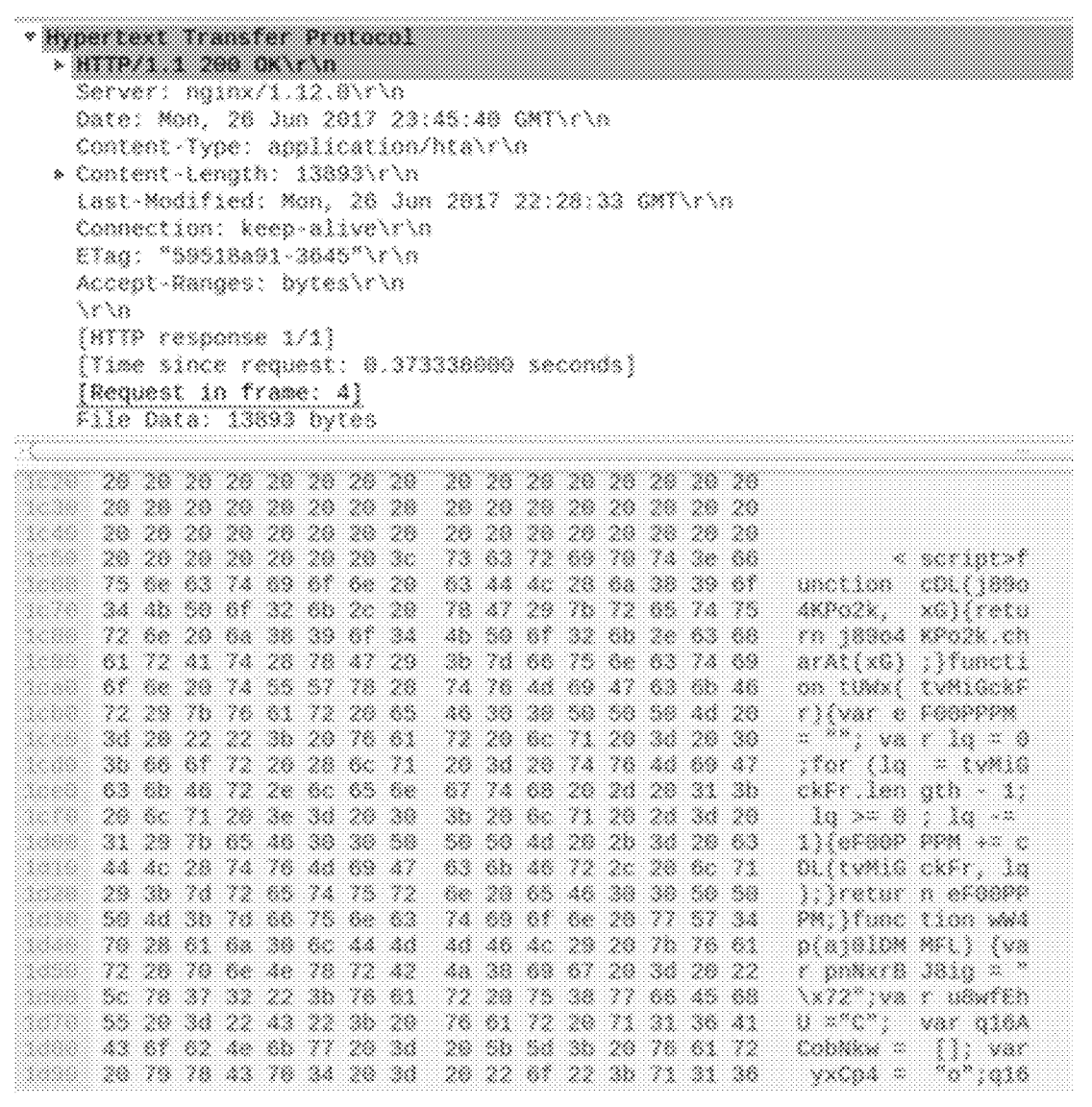

While BRTS was stopping the spread of this email attack in the early hours, it was also actively analyzing the cyber attack from the collected samples. FIG. 3B depicts an example of a screenshot of cyber attack risk analysis report for the attached RTF file type of NotPetya and FIG. 3C depicts an example of a screenshot of an analysis of what the RTF file type tries to do when an attachment to the Not-Petya-type ransomware was downloaded. During the analysis, BRTS identified several Indicators of Compromise (IoC) of this attack and the following artifacts in this attack were observed:

File Name Order-20062017.doc (RTF with CVE-2017-0199), hash Identifier 415FE69BF32634CA98FA07633F4118E1

File with SHA256 hash: 027cc450ef5f8c5f653329641ec1fed91f694e0d229928963b30f6b0d7d3a745

File with SHA256 hash: 17dacedb6f0379a65160d73c0ae3aa1f03465ae75cb6ae754c7dcb3017af1fbd Note that an email threat vector (Peta.A) of the attack was first observed by BRTS beginning on Jun. 26, 2017, one day before the actual attack so users of BRTS got advanced warning, e.g., an index of elevated warning of an imminent attack. By the time the first NotPetya attack was reported on Jun. 27, 2017, BRTS had been able to block the attack from reaching its user/customers. In the meantime, BRTS were collecting more intelligence on the samples collected from the attack and matching samples, hashes, and IoC to multiple external references while continuously updating the index to the users. The intelligence and analysis was then fed back into the system to protect its users all over the world.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

What is claimed is:

1. A computer-implemented method to support cyber security threat index (CSTI) generation, comprising:

continuously collecting data on risks of current and/or potential cyber attacks from a plurality of data pools over networks, systems, and/or products, wherein the collected data is used in real time cyber attack risk analysis, wherein data being collected from at least one of the data pools is actual a data to be processed for cyber attack risk analysis and wherein data being collected from at least one of the data pools is influential data on the collected data;

synchronizing and correlating the data being collected from the data pools once the data is available, wherein the synchronization and correlation of the collected data from the data pools creates fidelity among the data from the plurality of data pools;

calculating a composite CSTI based on the correlated data, and further based on cleansed data on cyber attack risks, and further based on corresponding influential data of the CSTI, wherein the CSTI provides a user with an indication of a current risk of a cyber attack and wherein the CSTI also predicts an elevated level of risk of a future cyber attack;

presenting the CSTI to the user along with one or more suggested applications by the user in response to the CSTI, to block the current cyber attack and/or to prevent the future cyber attack.

2. The computer-implemented method of claim 1, further comprising:

collecting the data from the data pools by one or more of streaming, pushing or pulling raw data in its original format, data normalized with respect to other data sources, and/or full-text-searchable indexes of data.

3. The computer-implemented method of claim 1, further comprising:

optimizing the collected data into consume-ready form in order to reduce processing time for data correlation.

4. The computer-implemented method of claim 1, further comprising:

collecting the data through network traffic logs and operational telemetry.

5. The computer-implemented method of claim 1, further comprising:

aggregating and consolidating the pool of data so that the data can be viewed from different perspectives.

6. The computer-implemented method of claim 1, further comprising:

deriving the pool of influential data from one or more of social media, news media and geopolitical-related events associated with the user.

7. The computer-implemented method of claim 1, further comprising:

intervening automatically or manually to adjust or overwrite the influential data.

8. The computer-implemented method of claim 1, further comprising:

realigning the data in one data pool with the corresponding influential data in another data pool so that the data can be weighed appropriately during cyber attack risk analysis.

9. The computer-implemented method of claim 1, further comprising:

cleansing the collected data of information that is unrelated to cyber attack risk analysis and prepare the data to be used for CSTI calculation once the data from different data pools has been correlated.

10. The computer-implemented method of claim 1, further comprising:
calculating the CSTI by utilizing a predicative model on a scale, wherein the predicative model is defined, customized and/or implemented specific to a context of computer systems and networks of the user.

11. The computer-implemented method of claim 10, further comprising:
customizing implementation of the predicative model for a specific user application, which utilizes the CSTI for automated responses to a current or future cyber attack that maps to a granularity of the scale of such attack.

12. The computer-implemented method of claim 1, further comprising:
calculating the CSTI as a product of a maximum value of a scale and a sum of all scores based on the data with coefficient of their influenced weights divided by total artifacts of the cyber attacks observed within a time window.

13. The computer-implemented method of claim 1, further comprising:
accepting an inquiry from the user for additional information or details on the risk of current or future cyber attacks around the globe or specific to the user and interactively present such information to the user accordingly.

14. The computer-implemented method of claim 1, further comprising:
recognizing, accepting, and executing a verbal instruction from the user and perform operations corresponding to the verbal instruction accordingly via a voice-activated device.

15. A system to support cyber security threat index (CSTI) generation, comprising:
a plurality of computing devices,
wherein at least one computing device of the plurality of computing devices comprises a data collection engine configured to continuously collect data on risks of current and/or potential cyber attacks from a plurality of data pools over computer networks, computer systems, and/or products, wherein the collected data is used in real time cyber attack risk analysis, wherein data being collected from at least one of the data pools is a data being processed for cyber attack risk analysis and wherein data being collected from at least one of the data pools is influential data on the collected data;
wherein at least one computing device of the plurality of computing devices comprises a data correlation engine configured to synchronize and correlate the data being collected from the data pools once the data is available, wherein the synchronization and correlation of the collected data from the data pools creates fidelity among the data from the plurality of data pools;
wherein at least one computing device of the plurality of computing devices comprises an index calculation engine configured to calculate a composite CSTI based on the correlated data, and further based on cleansed data on cyber attack risks, and further based on corresponding influential data of the CSTI, wherein the CSTI provides a user with an indication of a current risk of a cyber attack and wherein the CSTI also predicts an elevated level of risk of a future cyber attack;
wherein at least one computing device of the plurality of computing devices comprises a user interaction engine configured to present the CSTI to the user along with one or more suggested applications by the user in response to the CSTI, to block the current risk of cyber attack and/or to prevent the future cyber attack.

16. The system of claim 15, wherein:
the CSTI is in a global form that reflects the global risk of cyber attacks.

17. The system of claim 15, wherein:
the CSTI is in a customized form in context of current computing and network environment of the user to reflect the risk of cyber attacks that specifically target the user.

18. The system of claim 15, wherein:
the user is one of a person or human being, an organization, a group of organizations, a country, and a continent that may be subject to a cyber attack.

19. The system of claim 15, wherein:
the data collection engine is configured to collect the data from the data pools by one or more of streaming, pushing or pulling raw data in its original format, data normalized with respect to other data sources, and/or full-text-searchable indexes of data.

20. The system of claim 1, wherein:
the data collection engine is configured to optimize the collected data into consume-ready form in order to reduce processing time for data correlation.

21. The system of claim 1, wherein:
the data collection engine is configured to collect the data through network traffic logs and operational telemetry.

22. The system of claim 15, wherein:
the data collection engine is configured to aggregate and consolidate the pool of data so that the data can be viewed from different perspectives.

23. The system of claim 15, wherein:
the pool of data included one or more threats by file types weaponized for the cyber attacks and one or more threats by attack surfaces where the cyber attacks are launched.

24. The system of claim 23, wherein:
the pool of data further includes one or more cost of analytics and detection of the threats of cyber attacks in dollar amount, cost of analytics and detection of the threats of cyber attacks in terms of compute resources required, and the number of cyber attack incidents that have been analyzed and/or detected.

25. The system of claim 15, wherein:
the pool of influential data includes one or more of geographical locations of the data being collected, context of the data being collected, and the current trend of the data being collected.

26. The system of claim 25, wherein:
the pool of influential data further includes the context of the user for whom the cyber attack risk analysis is being performed, wherein such context includes computer system and/or network configurations and/or demographic information of the user.

27. The system of claim 15, wherein:
the data collection engine is configured to derive the pool of influential data from one or more of social media, news media and geopolitical-related events associated with the user.

28. The system of claim 15, wherein:
the data collection engine is configured to automatically or manually intervene to adjust or overwrite the influential data.

29. The system of claim 15, wherein:
the data correlation engine is configured to realign the data in one data pool with the corresponding influential data in another data pool so that the data can be weighed appropriately during cyber attack risk analysis.

30. The system of claim 15, wherein:
the data correlation engine is configured to cleanse the collected data of information that is unrelated to cyber attack risk analysis and prepare the data to be used for CSTI calculation once the data from different data pools has been correlated.

31. The system of claim 15, wherein:
the index calculation engine is configured to calculate the CSTI by utilizing a predicative model on a scale, wherein the predicative model is defined, customized and/or implemented specific to a context of computer systems and networks of the user.

32. The system of claim 31, wherein:
the predicative model has multiple dimensions including geographic locations of the data, application or file types of the cyber attack, surfaces of the cyber attack, and demographics of the user.

33. The system of claim 31, wherein:
the index calculation engine is configured to customize implementation of the predicative model for a specific user application, which utilizes the CSTI for automated responses to a current or future cyber attack that maps to a granularity of the scale of such attack.

34. The system of claim 15, wherein:
the index calculation engine is configured to calculate the CSTI as a product of a maximum value of a scale and a sum of all scores based on the data with coefficient of their influenced weights divided by total artifacts of the cyber attacks observed within a time window.

35. The system of claim 15, wherein:
one or more of the applications based on the CSTI are actions and remediation steps, which would help to stop a current attack or warn on potential attacks.

36. The system of claim 15, wherein:
the user interaction engine is configured to accept an inquiry from the user for additional information or details on the risk of current or future cyber attacks around the globe or specific to the user and interactively present such information to the user accordingly.

37. The system of claim 15, wherein:
the user interaction engine runs on a voice-activated device and is configured to recognize, accept, and execute a verbal instruction from the user and perform operations corresponding to the verbal instruction accordingly.

* * * * *